United States Patent
Haitsma et al.

(10) Patent No.: US 7,477,739 B2
(45) Date of Patent: Jan. 13, 2009

(54) EFFICIENT STORAGE OF FINGERPRINTS

(75) Inventors: Jaap Andre Haitsma, Eindhoven (NL); Antonius Adrianus Cornelis Maria Kalker, Eindhoven (NL); Steven Marco Schimmel, Eindhoven (NL)

(73) Assignee: Gracenote, Inc., Emeryville, CA (US)

( * ) Notice: Subject to any disclaimer, the term of this patent is extended or adjusted under 35 U.S.C. 154(b) by 785 days.

(21) Appl. No.: 10/503,245

(22) PCT Filed: Jan. 21, 2003

(86) PCT No.: PCT/IB03/00217

§ 371 (c)(1),
(2), (4) Date: Aug. 2, 2004

(87) PCT Pub. No.: WO03/067466

PCT Pub. Date: Aug. 14, 2003

(65) Prior Publication Data

US 2005/0141707 A1    Jun. 30, 2005

(30) Foreign Application Priority Data

Feb. 5, 2002    (EP) .................................. 02075498

(51) Int. Cl.
*H04L 9/00*    (2006.01)
(52) U.S. Cl. ...................... 380/201; 713/193
(58) Field of Classification Search .................... 726/13, 726/5; 713/186, 168, 193, 181; 380/201
See application file for complete search history.

(56) References Cited

U.S. PATENT DOCUMENTS

| | | |
|---|---|---|
| 4,677,466 A | 6/1987 | Lert, Jr. et al. |
| 5,019,899 A | 5/1991 | Boles et al. |
| 5,113,383 A | 5/1992 | Amemiya et al. |

(Continued)

FOREIGN PATENT DOCUMENTS

DE    4309957    7/1994

(Continued)

OTHER PUBLICATIONS

*The MusicBrainz Mailing List Archive for Nov. 2000*, 30 pgs.

(Continued)

*Primary Examiner*—Gilberto Barron, Jr.
*Assistant Examiner*—Samson B Lemma
(74) *Attorney, Agent, or Firm*—Schwegman, Lundberg & Woessner, P.A.

(57) ABSTRACT

A robust fingerprinting system is disclosed. Such a system can recognize unknown multimedia content (U(t)) by extracting a fingerprint (a series of hash words) from said content, and searching a resembling fingerprint in a database in which fingerprints of a plurality of known contents (K(t)) are stored. In order to more efficiently store the fingerprints in the database and to speed up the search, the hash words (H(n)) of known signals (K(t)) are sub-sampled (13) by a factor M prior to storage in the database (14). The hash words (H(n)) of unknown signals (U(t)) are divided (16) into M interleaved sub-series (H0(n) . . . HM−1(n)). The interleaved sub-series are selectively (17) applied to the database (14) under the control of a computer (15). If only one of the sub-series sufficiently matches a stored fingerprint, the signal is identified.

8 Claims, 2 Drawing Sheets

U.S. PATENT DOCUMENTS

| | | |
|---|---|---|
| 5,276,629 A | 1/1994 | Reynolds |
| 5,400,261 A | 3/1995 | Reynolds |
| 5,436,653 A | 7/1995 | Ellis et al. |
| 5,499,294 A | 3/1996 | Friedman |
| 5,612,729 A | 3/1997 | Ellis et al. |
| 5,616,876 A | 4/1997 | Cluts |
| 5,621,454 A | 4/1997 | Ellis et al. |
| 5,703,795 A | 12/1997 | Mankovitz |
| 5,767,893 A | 6/1998 | Chen et al. |
| 5,822,436 A | 10/1998 | Rhoads |
| 5,893,910 A | 4/1999 | Martineau et al. |
| 5,925,843 A | 7/1999 | Miller et al. |
| 5,960,081 A | 9/1999 | Vynne et al. |
| 5,987,525 A | 11/1999 | Roberts et al. |
| 6,034,925 A | 3/2000 | Wehmeyer |
| 6,061,680 A | 5/2000 | Scherf et al. |
| 6,076,104 A | 6/2000 | McCue |
| 6,076,111 A | 6/2000 | Chiu et al. |
| 6,195,693 B1 | 2/2001 | Berry et al. |
| 6,201,176 B1 | 3/2001 | Yourlo |
| 6,240,459 B1 | 5/2001 | Roberts et al. |
| 6,247,022 B1 | 6/2001 | Yankowski |
| 6,266,429 B1 | 7/2001 | Lord et al. |
| 6,272,078 B2 | 8/2001 | Yankowski |
| 6,345,256 B1 | 2/2002 | Milsted et al. |
| 6,388,957 B2 | 5/2002 | Yankowski |
| 6,388,958 B2 | 5/2002 | Yankowski |
| 6,408,082 B1 | 6/2002 | Rhoads et al. |
| 6,505,160 B1 | 1/2003 | Levy et al. |
| 6,633,653 B1 | 10/2003 | Hobson et al. |
| 6,647,128 B1 | 11/2003 | Rhoads |
| 6,665,417 B1 | 12/2003 | Yoshiura et al. |
| 6,674,876 B1 | 1/2004 | Hannigan et al. |
| 6,700,990 B1 | 3/2004 | Rhoads |
| 6,737,957 B1 | 5/2004 | Petrovic et al. |
| 6,748,533 B1 | 6/2004 | Wu et al. |
| 6,782,116 B1 | 8/2004 | Zhao et al. |
| 6,829,368 B2 | 12/2004 | Meyer et al. |
| 6,941,003 B2 | 9/2005 | Ziesig |
| 6,941,275 B1 | 9/2005 | Swierczek |
| 6,952,774 B1 | 10/2005 | Kirovski et al. |
| 6,963,975 B1 | 11/2005 | Weare |
| 6,983,289 B2 | 1/2006 | Commons et al. |
| 6,990,453 B2 | 1/2006 | Wang et al. |
| 7,024,018 B2 | 4/2006 | Petrovic |
| 7,080,253 B2 | 7/2006 | Weare |
| 7,082,394 B2 | 7/2006 | Burges et al. |
| 7,159,117 B2 | 1/2007 | Tanaka |
| 7,349,555 B2 | 3/2008 | Rhoads |
| 2001/0004338 A1 | 6/2001 | Yankowski |
| 2002/0023020 A1 | 2/2002 | Kenyon et al. |
| 2002/0033844 A1 | 3/2002 | Levy et al. |
| 2002/0059208 A1 | 5/2002 | Abe et al. |
| 2002/0078359 A1 | 6/2002 | Seok et al. |
| 2002/0116195 A1 | 8/2002 | Pitman et al. |
| 2002/0178410 A1 | 11/2002 | Haitsma et al. |
| 2003/0023852 A1 | 1/2003 | Wold |
| 2003/0028796 A1 | 2/2003 | Roberts et al. |
| 2003/0033321 A1 | 2/2003 | Schrempp et al. |
| 2003/0086341 A1 | 5/2003 | Wells et al. |
| 2004/0028281 A1 | 2/2004 | Cheng et al. |
| 2004/0172411 A1 | 9/2004 | Herre et al. |
| 2005/0004941 A1 | 1/2005 | Kalker et al. |
| 2006/0041753 A1 | 2/2006 | Haitsma |
| 2006/0075237 A1 | 4/2006 | Seo et al. |
| 2006/0143190 A1 | 6/2006 | Haitsma et al. |
| 2006/0206563 A1 | 9/2006 | Van De Sluis |
| 2006/0218126 A1 | 9/2006 | De Rujter et al. |
| 2007/0071330 A1 | 3/2007 | Oostveen et al. |
| 2007/0106405 A1 | 5/2007 | Cook et al. |

FOREIGN PATENT DOCUMENTS

| | | |
|---|---|---|
| EP | 0283570 A3 | 9/1988 |
| EP | 0367585 A2 | 5/1990 |
| EP | 0319567 B1 | 2/1993 |
| EP | 0936531 A2 | 8/1999 |
| GB | 2338869 A1 | 12/1999 |
| JP | 63-104099 | 5/1988 |
| JP | 40299399 | 10/1992 |
| JP | 06-225799 | 8/1994 |
| JP | 06315298 | 11/1994 |
| JP | 11-261961 | 9/1999 |
| JP | 2000-305578 | 11/2000 |
| JP | 2001283568 A2 | 10/2001 |
| WO | WO-O9825269 | 6/1998 |
| WO | WO-9935771 | 7/1999 |
| WO | WO-0128222 | 4/2001 |
| WO | WO-0211123 A3 | 2/2002 |
| WO | WO-02065782 A1 | 8/2002 |
| WO | WO-03012695 A2 | 2/2003 |
| WO | WO-2004077430 | 2/2004 |
| WO | WO-2006044622 | 4/2006 |

OTHER PUBLICATIONS

"U.S. Appl. No. 09/933,845 Final Office Action mailed May 19, 2005", 10 pgs.

"U.S. Appl. No. 09/933,845 Final Office Action mailed Jul. 3, 2007", 15 pgs.

"U.S. Appl. No. 09/933,845 Final Office Action mailed Jul. 5, 2006", 14 pgs.

"U.S. Appl. No. 09/933,845 Non Final Office Action mailed Jan. 3, 2006", 9 pgs.

"U.S. Appl. No. 09/993,845 Non Final Office Action mailed Oct. 27, 2004", 7 pgs.

"U.S. Appl. No. 09/933,845 Non Final Office Action mailed Nov. 30, 2006", 15 pgs.

"U.S. Appl. No. 09/933,845 Response filed Jan. 27, 2005 to Non Final Office Action mailed Nov. 27, 2004", 8 pgs.

"U.S. Appl. No. 09/933,845 Response filed Mar. 28, 2006 to non-final office action mailed Jan. 3, 2006", 9 pgs.

"U.S. Appl. No. 09/933,845 Response filed Mar. 30, 2007 to Non Final Office Action mailed Nov. 30, 2006", 8 pgs.

"U.S. Appl. No. 10/073,772 Advisory Action mailed Jul. 28, 2006", 3 pgs.

"U.S. Appl. No. 10/073,772 Final Office Action mailed Apr. 6, 2006", 21 pgs.

"U.S. Appl. No. 10/073,772 Non Final Office Action mailed Sep. 19, 2005", 13 pgs.

"U.S. Appl. No. 10/073,772 Notice of Allowance mailed Feb. 28, 2007", 6 pgs.

"U.S. Appl. No. 10/073,772 Notice of Allowance mailed Aug. 9, 2007", NOAR,10 pgs.

"U.S. Appl. No. 10/073,772 Notice of Allowance mailed Sep. 6, 2006", 5 pgs.

"U.S. Appl. No. 10/073,772 Response filed Mar. 17, 2006 to Non Final Office Action mailed Sep. 19, 2005", 12 pgs.

"U.S. Appl. No. 10/073,772 Response filed Jul. 6, 2006 to Final Office Action mailed Apr. 6, 2006", 8 pgs.

"U.S. Appl. No. 10/073,772 Response filed Aug. 7, 2006 to Advisory Action mailed Jul. 28, 2006", 3 pgs.

"U.S. Appl. No. 10/533,211 Non Final Office Action mailed Nov. 14, 2006", 9 pgs.

"U.S. Appl. No. 10/533,211 Non Final Office Action mailed Jun. 12, 2007", 8 pgs.

"U.S. Appl. No. 10/533,211 Response filed Mar. 14, 2007 to non-final office action mailed Nov. 14, 2006", 8 pgs.

"U.S. Appl. No. 10/548,702 Response filed Aug. 29, 2007 to Non-Final Office Action mailed Jun. 21, 2007", 64.

"U.S. Appl. No. 10/548,702 Non-Final Office Action mailed Jun. 21, 2007", 18 pgs.

"U.S. Appl. No. 10/533,211, Response filed Oct. 1, 2007 to Non-Final Office Action mailed Jun. 12, 2007", 12 pgs.

"European Application Serial No. 01 976124 Office Action dated Mar. 16, 2007", (Mar. 16, 2007),5 pgs.

"European Patent Application No. 03737399.0 Office Action", (Mar. 26, 2007).

"Generic coding of moving pictures and associated audio information, part 2", *ISO/IEC*, (1995).

"International Application No. PCT/EP01/09623 International Search Report mailed", (Jul. 2, 2002),4 pages.

Broder, A. Z., et al., "Syntactic clustering of the Web", *Computer Networks and ISDN Systems*, 29(8-13), (Sep. 1997),1157-1166.

Chen, Qin-Sheng, et al., "Symmetric Phase-Only Matched Filtering of Fourier-Mellin Transforms for Image Registration and Recognition", *IEEE Transactions on Pattern Analysis and Machine Intelligence*, 16 No. 12, New York, (Dec. 1994),1156-1168.

Cheung, D., et al., "A content-based search engine on medical images for telemedicine", *Proceedings of the 21st International Computer Software and Applications Conference*, (Aug. 13, 1997),569-572.

Fletcher, Peter A., et al., "Direct Embedding and Detection of RST Invariant Watermarks", *F.A.P. Petitcolas (Ed.): IH 2002*, LNCS 2578 Springer-Verlag Berlin Heidelberg, (2003),129-144.

Haitsma, J., et al., "A Highly Robust Audio Fingerprinting System", *ISMIR 2002—3rd International Conference on Music Information Retrieval*, http://ismir2002.ismir.net/proceedings/02-fp04-2.pdf,(Oct. 17, 2002),1-9.

Haitsma, Jaap, "Robust Audio Hashing for Content Identification", *Philips Research*, 8 pages.

Haitsma, J. A., et al., "Robust Hashing of Multimedia Content", Dec. 14, 2000, 10 pgs.

Kurth, Frank, et al., "Full-Text Indexing of Very Large Audio Data Bases", *Audio Engineering Society Convention Paper*, 110th Convention, Amsterdam, (May 2001),1-11.

Lienhart, R., "Automatic text recognition for video indexing", *Proceedings of the Fourth ACM International Conference on Multimedia*, (1997), 11-20.

Lin, Ching-Yung, et al., "Rotation, Scale, and Translation Resilient Watermarking for Images", *IEEE Transactions on Image Processing*, vol. 10, No. 5, (May 2001),767-782.

Martin, Keith D., et al., "Music Content Analysis through Models of Audition", (1998),8 pgs.

McNab, Rodger J., et al., "Towards the digital music library: tune retrieval from acoustic input", *Proceedings of the First ACM International Conference on Digital Libraries*, (1996),11-18.

Neuschmied, Helmut, et al., "Content-based Identification of Audio Titles on the Internet", *Proceedings of the First International Conference on Web Delivering of Music*, (2001),5 pages.

Oostveen, J., et al., "Feature Extraction and a Database Strategy for Video Fingerprinting", *Lecture Notes in Computer Science*, 2314, (Mar. 11, 2002),117-128.

Oostveen, Job, "Visual Hashing of Digital Video: Applications and Techniques", 11 pages.

Pereira, Shelby, "Template Based Recovery of Fourier-Based Watermarks Using Log-Polar and Log-log Maps", *IEEE Int. Conf on Multimedia Computing and Systems*, Florence, Italy, (Jun. 1999),1-5.

Rajasekaran, P., et al., "Microcomputer Implementable Low Cost Speaker-Independent Word Recognition", *IEEE International Conference on ICASSP '83. Acoustics, Speech, and Signal Processing*, Abstract; p. 754, right-hand column, Appendix A, A.1, A.2; figure 1,(Apr. 14-16, 1983),753-756.

Rhoads, Geoffrey B., et al., "Managing on-line media library through links in media signals", *U.S. Appl. No. 60/178,028*.

Schneider, Marc, et al., "A Robust Content Based Digital Signature for Image Authentication", *International Conference on Image Processing, 1996. Proceedings.*, vol. 3, (1996),227-230.

Schneier, Bruce, "Chapter 16, Pseudo random sequence generators", *In Applied Cryptography*, John Wiley & Sons, New York, US, (1996),372-379.

Subramanya, S R., et al., "Transform-Based Indexing of Audio Data for Multimedia Databases", *1997 IEEE*, (1997),211-218.

Wells, Maxwell J., et al., "Music Search Methods Based on Human Perception", *U.S. Appl. No. 09/556,086, filed Apr. 21, 2000*.

Welsh, Matt, et al., "Querying Large Collections of Music for Similarity", *Technical Report UCB/CSD00—1096, U.C. Berkeley Computer Science Division*, Research sponsored by Advanced Research Projects Agency under grant DABT63-98-C-0038, and equipment grant from Intel Corp.,(Nov. 1999),13 pages.

Wold, E., "Content-based classification, search,. and retrieval of audio", *IEEE MultiMedia*, 3(3), (Fall 1996),27-36.

Yang, Cheng, "MACS: Music Audio Characteristic Sequence Indexing for Similarity Retrieval", *Supported by Leonard J. Shustek Fellowship, Stanford Graduate Fellowship program, and NSF Grant IIS-9811904* New Paltz, New York, (Oct. 2001),123-126.

Haitsma et al. : Robust Hashing for Content Identification, published at the Content-Based Multimedia Indexing (CBMI) conference in Brescia (Italy), 2001.

Oostveen, et al, "Visual hashing of digital video: applications and techniques", Proceedings of the SPIE, vol. 4472, pp. 121-131.

H.J.R Schmitz, "Generating and matching hashes of multimedia content", European Application01200505.4, U.S. Appl. No. 10/073,772, filed Feb. 11, 2002.

J. Haitsma, "Generating and matching hashes to identify information signals", European Application 01202720.7, filed Jul. 17, 2001.

"U.S. Appl. No. 09/933,/845, Response filed Oct. 22, 2007 to Final Office Action mailed Jul. 3, 2007", 13 pgs.

"U.S. Appl. No. 09/933,845, Non-Final Office Action mailed Feb. 29, 2008", 13 Pgs.

"U.S. Appl. No. 10/073,772, Non-Final Office Action Mailed Jan. 9, 2008", 14 pgs.

"U.S. Appl. No. 10/529,360, Non-Final Office Action mailed Apr. 23, 2008", 10 pgs.

"U.S. Appl. No. 10/533,211, Response filed Mar. 5, 2008 to Final Office Action mailed Dec. 15, 2007", 6 pgs.

"U.S. Appl. No. 10/533,211 Non-Final Office Action mailed Jul. 29, 2008", 14 pgs.

"U.S. Appl. No. 10/533,211, Response filed May 13, 2008 to Final Office Action mailed Dec. 5, 2007", 13 pgs.

"U.S. Appl. No. 10/533,211 Final Office Action mailed Dec. 5, 2007", 13 pgs.

"U.S. Appl. No. 10/534,323, Non-Final Office Action mailed Apr. 16, 2008", 7 pgs.

"U.S. Appl. No. 10/534,323, Response filed Jan. 3, 2008 to Non-Final Office Action mailed Oct. 3, 2007", 9 pgs.

"U.S. Appl. No. 10/534,323, Response filed Jul. 16, 2008 to Non Final Office Action mailed Apr. 16, 2008", 9 pgs.

"U.S. Appl. No. 10/534,323, Non-Final Office Action mailed Oct. 3, 2007", 8 Pages.

"International Application Serial No. 01976124.6, Office Action mailed Jan. 2, 2008", 7 pgs.

"International Application Serial No. 03798257.6, Office Action mailed Feb. 7, 2008", 6 pgs.

"International Application Serial. No. 1976124.6, Office Action mailed Aug. 4, 2005", 4 pgs.

"Japanese Application Serial No. 2002-565363, Final Office Action mailed Jul. 14, 2008", 12 pgs.

"Korean Application Serial No. 10-2002-7005203, Office Action mailed May 28, 2008", 8 pgs.

Haitshma, J., et al., "Speed- Change Resistant Audio fingerprinting using Auto-correlation", *Philips Research Laboratories Eindhoven, IEEE*, (2003), pp. 728-731.

Stephen, D., "The Exploratory Workshop on Music Information Retrieval", ACM Sigir, (Aug. 19, 1999), 1-14.

"International Application Serial No. 2002-565363, Non-Final Office Action mailed Oct. 11, 2007", With English Translation,22 pgs.

"International Application Serial No. IN/PCT/2002/1689, First Examination Report Jun. 20, 2007", 2 pgs.

EFFICIENT STORAGE OF FINGERPRINTS

FIELD OF THE INVENTION

The invention relates to a method and arrangement for storing fingerprints identifying audio-visual media signals in a database. The invention also relates to a method and arrangement for identifying an unknown audio-visual media signal.

BACKGROUND OF THE INVENTION

A fingerprint (in literature also referred to as signature or hash) is a digital summary of an information signal. In cryptography, hashes have been used for a long time to verify correct reception of large files. Recently, the concept of hashing has been introduced to identify multi-media content. Unknown content such as an audio or video clip is recognized by comparing a fingerprint extracted from said clip with a collection of fingerprints stored in a database. In contrast with a cryptographic hash, which is extremely fragile (flipping a single bit in the large file will result in a completely different hash), a fingerprint extracted from audio-visual content must be robust. To a large extent, it must be invariant to processing such as compression or decompression, A/D or D/A conversion.

A prior-art fingerprinting system is disclosed in Haitsma et al.: Robust Hashing for Content Identification, published at the Content-Based Multimedia Indexing (CBMI) conference in Brescia (Italy), 2001. As described in this article, the fingerprint is derived from a perceptually essential property of the content, viz. the distribution of energy in bands of the audio frequency spectrum. For video signals, the distribution of luminance levels in video images has been proposed to constitute the basis for a robust fingerprint.

A fingerprint is created by dividing the signal into a series of (possibly overlapping) frames, and extracting a hash word representing the perceptually essential property of the signal within each frame to obtain a respective series of hash words. In order to identify an unknown clip, the database receives the series of hash words concerned, and searches the most similar stored series of hash words. Similarity is measured by determining how many bits of the series match a series of hash words in the database. If the BER (Bit Error Rate, the percentage of the non-matching bits) is below a certain threshold, the clip is identified as the song or movie from which the most similar series of hash words in the database originates.

A problem of the prior-art fingerprinting method is the size of the database. In the Haitsma et al. article, the audio signal is divided into frames of 0.4 seconds with an overlap of $31/32$. This results in a new frame every 11.6 ms (=0.4/32). For every frame, a 32-bit hash word is extracted. Accordingly, a 5-minute song needs approximately 100 kbytes, viz. 5 (minutes)×60 (seconds)×4 (bytes per hash word)/0.0116 (seconds per hash word). Needless to say that the database must have a huge capacity to allow recognition of a large repertoire of songs. Similar considerations apply to video fingerprinting systems.

OBJECT AND SUMMARY OF THE INVENTION

It is an object of the invention to provide a method and system for storing fingerprints in a database, which alleviates the above-mentioned problem. It is also an object of the invention to provide a method and system for identifying an unknown audio-visual signal in such a database.

To this end, the invention provides a method for storing fingerprints in a database as defined in independent claim 1. The method differs from the prior art in that only a sub-sampled sequence of hash words (i.e. one out of every M hash word) is stored in the database. The word "sequence" is used in this claim to refer to a full-length signal (song or movie). A storage reduction by a factor M is achieved.

A method of identifying an unknown audio-visual signal in such a database is defined in independent claim 4. As there is uncertainty as to which of M possible sub-sampled sequences of hash words is stored in the database, a full (i.e. not sub-sampled) series of hash words is extracted from the unknown clip in accordance with this method. The word "series" is used here to refer to a possibly short segment or clip of the unknown signal. Interleaved sub-series of hash words are now successively applied to the database for matching with the sub-sampled sequences stored therein. If at least one of the applied sub-series has a BER below a certain threshold, the signal is identified.

It is achieved with the invention that the storage requirements are reduced (by a factor M), while the robustness and the reliability of the prior-art identification method are maintained.

Further advantageous embodiments of the methods are defined in the dependent claims.

DESCRIPTION OF EMBODIMENTS

Figure 1:
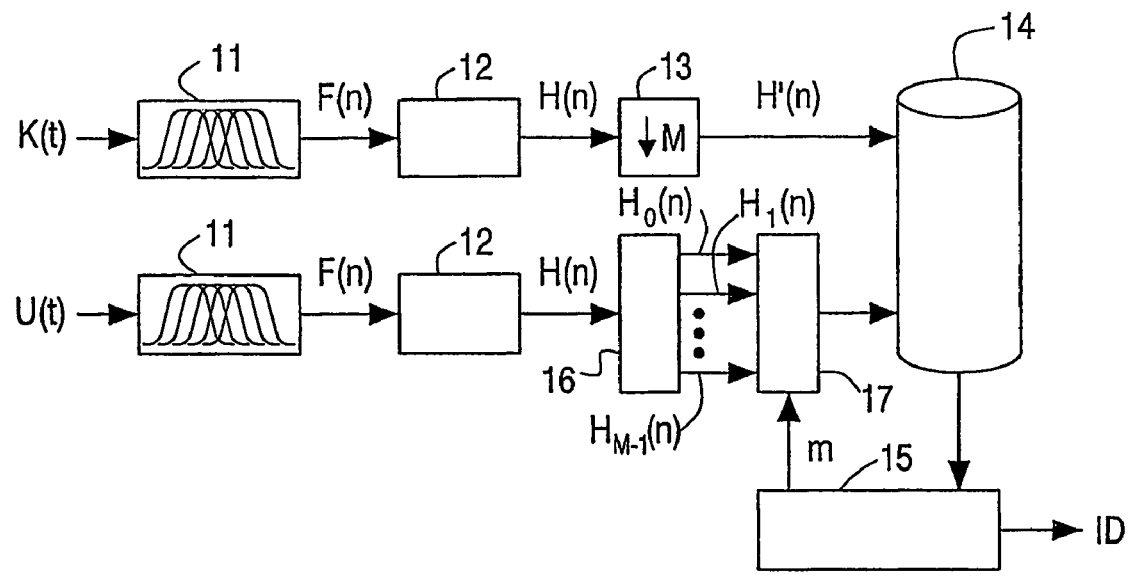
FIG. 1 shows a schematic diagram of an arrangement for storing and identifying fingerprints of audio-visual media signals in a database in accordance with the invention.

The invention will be described for audio signals. FIG. 1 shows a schematic diagram of an arrangement in accordance with the invention. The arrangement is used for storing fingerprints of known audio signals in a database (first operational mode), as well as for identifying an unknown audio signal (second operational mode).

The first operational mode (storage) of the arrangement will be described first. In this mode, the arrangement receives a fall-length music song K(t). The signal is divided, in a framing circuit 11, into time intervals or frames F(n) having a length of approximately 0.4 seconds and weighted by a Hanning window with an overlap of $31/32$. The overlap is used to introduce a large correlation between subsequent frames. For audio signals, this is a prerequisite because the framing applied to unknown signals to be recognized may be different.

Figure 2:
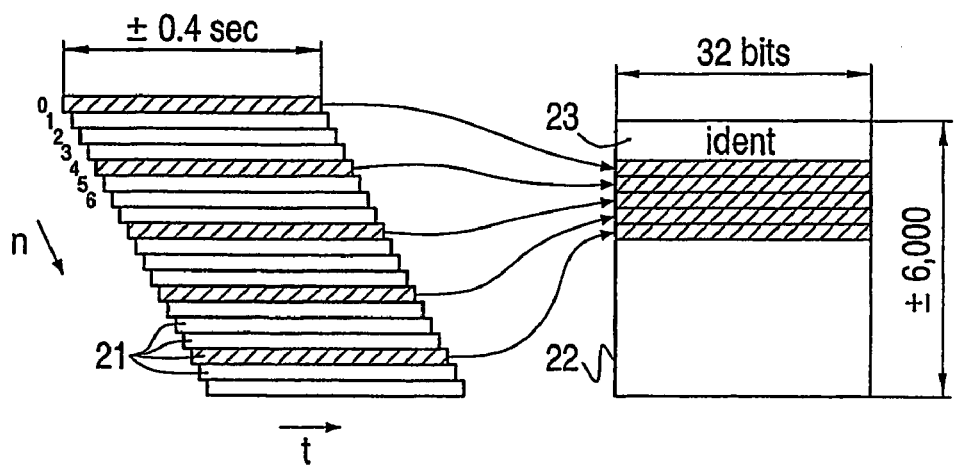
FIG. 2 is a diagram to illustrate a first operational mode of the arrangement which is shown in FIG. 1.

The framing circuit 11 generates a new frame every 11.6 ms (=0.4/32). A hash extracting circuit 12 generates a 32-bit hash word H(n) for every frame. A practical embodiment of such a hash extracting circuit is described in the Haitsma et al. article referred to in the chapter Background of the Invention. Briefly summarized, the circuit divides the frequency spectrum of each audio signal frame into frequency bands and produces for each band a hash bit indicating whether the energy in said band is above or below a given threshold. FIG. 2 shows a sequence of hash words 21 thus obtained.

In accordance with the invention, the sequence of hash words is sub-sampled by a factor M by a sub-sampler 13, which produces a sub-sequence H'(n). The sub-sequence of hash words, along with identification data such as title of the song, name of the artist, etc., constitutes a fingerprint of the known music song. Such a fingerprint is shown in FIG. 2, where numeral 22 denotes the sub-sequence of hash words, and numeral 23 denotes title, artist, etc., identifying the song. The fingerprint is stored in a database 14 under the control of a computer 15. In this example, where a sub-sampling factor M=4 has been used by way of example, a 5-minute song requires approximately 6,000×32 bits storage capacity. This is a saving of 75% as compared with the prior-art system where sub-sampling is not applied. In practice, the storage operation described above is performed for a huge number of known music songs. It will be appreciated that the order of the operations of hash word extraction (12) and sub-sampling (13) maybe reversed.

The second operational mode (identification) of the arrangement will now be described. In this mode, the arrangement receives a part (say, 3 seconds) of an unknown song. i.e. an audio clip U(t). The clip is processed by a similar (or the same) framing circuit 11 and hash extracting circuit 12 as described above. The hash extraction circuit 13 extracts a full hash block (no sub-sampling) of the clip. For a 3-second clip, this operation yields a series of approximately 256 hash words H(n). Such a series of hash words representing the unknown audio clip is also referred to as hash block. In an alternative embodiment, the hash block has been extracted by a remote station and is merely received by the arrangement.

Figure 3:
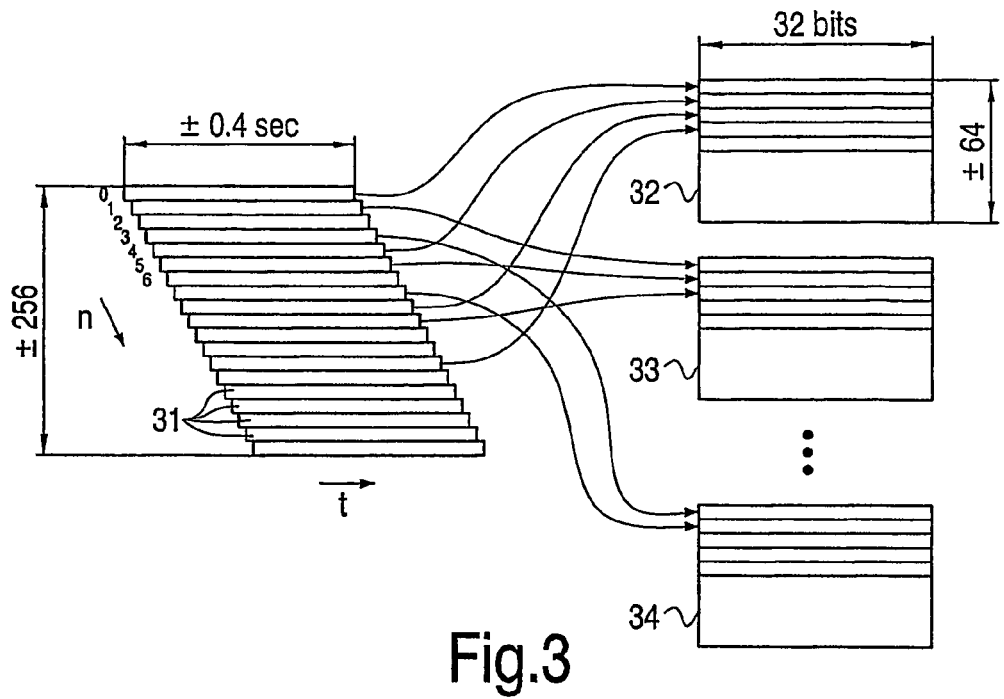
FIG. 3 is a diagram to illustrate a second operational mode of the arrangement which is shown in FIG. 1.

The hash block is applied to an interleaving circuit 16, which divides it into M interleaved sub-series or sub-blocks $H_0(n), H_1(n), \ldots H_{M-1}(n)$, where M is the same integer as used in the sub-sampler 13 described above. FIG. 3 illustrates the interleaving process for M=4. In this Figure, numeral 31 denotes successive hash words of the hash block, numeral 32 denotes sub-block $H_0(n)$, numeral 33 denotes sub-block $H_1(n)$, and numeral 34 denotes sub-block $H_{M-1}(n)$.

The sub-blocks are applied to respective inputs of a selection circuit 17. Under the control of the computer 15, the sub-blocks $H_0(n), H_1(n), \ldots H_{M-1}(n)$ are successively applied to the database 14 for identification. If a series of hash words is found in the database, for which the bit error rate BER (i.e. the percentage of non-matching bits between said series and the applied sub-block) is below a certain threshold, the fingerprint comprising said series of hash words identifies the unknown audio clip.

Figure 4:
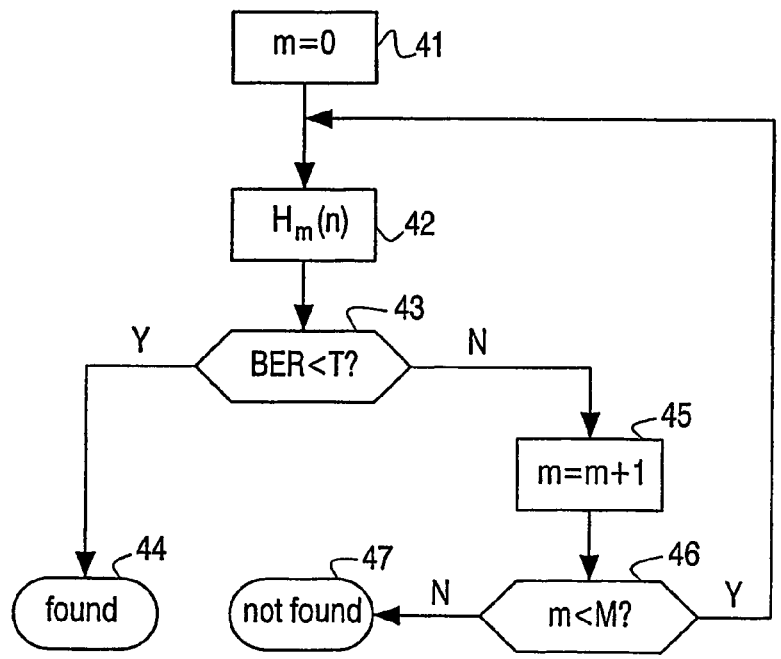
FIG. 4 is a flow chart of operational steps performed by a computer which is shown in FIG. 1.

FIG. 4 shows a flow chart of this identification process which is performed by the computer 15. In a step 41, an index m obtains an initial value 0. The index m is applied to the selection circuit 17 so that the first interleaved sub-block $H_0(n)$ of hash words is selected for identification. In a step 42, the selected sub-block $H_m(n)$ is applied to the database. In a step 43, it is checked whether a resembling series of hash words has been found in the database. The word "resembling" is understood to refer to the series of hash words having the lowest BER provided that said BER, is less than a given threshold T. An actual example of a strategy of searching the most resembling series of hash words in the database is disclosed in the Haitsma et al. article mentioned before. Advantageous embodiments of search strategies are also proposed in Applicant's pending unpublished European patent applications 01200505.4 (PHNL010110) and 01202720.7 (PHNL010510).

If the BER is below the threshold, the audio clip has been identified. The title and performer of the song as stored in the database (23 in FIG. 2) are then communicated to the user in a step 44. If that is not the case, the index m is incremented (step 45) so that another one of the interleaved sub-blocks is applied to the database. If all M interleaved sub-blocks have been searched without success (step 46), the audio clip could not be identified. This outcome is communicated to the user in a step 47.

It is achieved with the invention that the database capacity is reduced by a factor M. It should be noted that the same reduction can effectively be achieved by choosing a different frame overlap, viz. ⅞ in the present example. This is true as far as the first operational mode (storage) is concerned. However, if the same overlap of ⅞ without interleaving was chosen in the identification process, the robustness and reliability of the identification would be seriously affected. The invention resides in the concept of interleaving in the second operational mode (identification). It is achieved thereby that at least one of the interleaved sub-blocks is derived from a series of frames that substantially matches (in time) the series of frames from which the stored hash words have been derived. The identification process in accordance with the invention yields substantially the same robustness and reliability as the prior-art (non-interleaving) method with an overlap of $^{31}\!/_{32}$. A mathematical background thereof will now be given.

When a sub-sampling with a factor M is applied and if the bits in a hash block are random i.i.d. (independent and identically distributed), the standard deviation of the BER increases by a factor $\sqrt{M}$. This implies that either the robustness and/or the reliability is/are affected. If the threshold on the BER is kept the same, then the robustness is unaffected but the reliability decreases. If on the other side the threshold is decreased by an appropriate amount, then the reliability stays the same but the robustness decreases.

However, the bits in a hash block of an audio-visual media signal have a large correlation along the time axis, which is introduced by the large overlap of the framing and inherent correlation in music. Therefore, the standard deviation s does not increase by the factor $\sqrt{M}$ when sub-sampling with the factor M is applied. Experiments have shown that, for small values of M, the standard deviation does not even increase significantly at all. In a practical system without sub-sampling, the threshold on BER is set to 0.35. If sub-sampling by a factor M=4 is applied, then the threshold has only to be lowered to 0.342. Therefore, the decrease of robustness is insignificant, whilst the needed storage in the database has been decreased by a factor of 4. Furthermore, the time needed to search a hash database will decrease simply because there are 4 times fewer hash values in the database.

The search speed can even be further increased by refraining from applying a further sub-block to the database if one of the sub-blocks (generally the first) appears to have a BER which is larger than a further threshold (which is substantially larger than the threshold T). Because of the large correlation between sub-blocks (due to the frame overlap and inherent correlation in music), it is unlikely that another sub-block will have a significantly lower BER.

A robust fingerprinting system is disclosed. Such a system can recognize unknown multimedia content (U(t)) by extracting a fingerprint (a series of hash words) from said content, and searching a resembling-fingerprint in a database in-which fingerprints of a plurality of known contents (K(t)) are stored. In order to more efficiently store the fingerprints in the database and to speed up the search, the hash words (H(n)) of known signals (K(t)) are sub-sampled (13) by a factor M prior to storage in the database (14). The hash words (H(n)) of unknown signals (U(t)) are divided (16) into M interleaved sub-series ($H_0(n) \ldots H_{M-1}(n)$). The interleaved sub-series are selectively (17) applied to the database (14) under the control of a computer (15). If only one of the sub-series sufficiently matches a stored fingerprint, the signal is identified.

The invention claimed is:

1. A method of storing fingerprints identifying audio-visual media signals in a database, the method comprising, for each audio-visual signal:
   dividing said audio-visual media signal into a sequence of frames;
   sub-sampling said sequence of frames by a factor M to obtain a sub-sampled sequence of frames, each frame of the sub-sampled sequence of frames overlapping in time with an adjacent frame of the sub-sampled sequence of frames, and the factor M being a positive integer;
   extracting, for each frame of said sub-sampled sequence of frames, a hash word derived from a perceptually essential property of the signal within said frame, to obtain a respective sub-sampled sequence of hash words, each hash word of the sub-sampled sequence of hash words being nonrandomly positioned within the sub-sampled sequence of hash words; and
   storing said sub-sampled sequence of hash words as a fingerprint in said database, the fingerprint being a digital summary of the audio visual media signal.

2. An arrangement to store fingerprints identifying audio-visual media signals (K(t)) in a database, the arrangement comprising:
   framing means for dividing said audio-visual media signals into a sequence of overlapping frames;
   sub-sampling means for sub-sampling said sequence of frames by a factor M to obtain a sub-sampled sequence of frames, each frame of the sub-sampled sequence of frames overlapping in time with an adjacent frame of the sub-sampled sequence of frames, and, the factor M being a positive integer;
   means for extracting, for each frame of said sub-sampled sequence of frames, a hash word (H(n)) derived from a perceptually essential property of the signal within said frame, to obtain a respective sub-sampled sequence of hash words, each hash word of the sub-sampled sequence of hash words being nonrandomly positioned within the sub-sampled sequence of hash words; and
   a database for storing said sub-sampled sequence of hash words as fingerprint in said database, the fingerprint being a digital summary of the audio visual media signal.

3. A method of identifying an unknown audio-visual media signal, the method comprising:
   dividing at least a part of the unknown audio-visual media signal into a series of frames;
   extracting, for each frame, a hash word representing a perceptually essential property of the signal within said frame, to obtain a respective series of hash words;
   dividing said series of hash words into M interleaved sub-series of hash words, each hash word of each of the M interleaved sub-series of hash words being extracted from a different frame of the series of frames, each frame of the series of frames overlapping in time with an adjacent frame of the series of frames, from which an adjacent hash word of the M interleaved sub-series of hash words is extracted, and each hash word of each of the M interleaved sub-series of hash words being nonrandomly positioned within each of the M interleaved sub-series of hash words;
   successively applying each of said M interleaved sub-series to a database in which, for a plurality of multi-media signals, a sub-sampled sequence of hash words has been stored; and
   identifying the unknown signal as the multi-media signal based on whether a difference between at least a part of the stored sub-sampled sequence of hash words and at least one of the M applied interleaved sub-series of hash words is less than a specific threshold value.

4. An arrangement to identify an unknown audio-visual media signal, the arrangement comprising:
   framing means for dividing at least a part of the unknown audio-visual media signal (U(t)) into a series of frames;
   means for extracting, for each frame, a hash word derived from a perceptually essential property of the signal within said frame, to obtain a respective series of hash words;
   interleaving means for dividing said series of hash words into M interleaved sub-series of hash words, each hash word of each of the M interleaved sub-series of hash words being extracted from a different frame of the series of frames, each frame of the series of frames overlapping in time with an adjacent frame of the series of frames, from which an adjacent hash word of the M interleaved sub-series of hash words is extracted, and each hash word of each of the M interleaved sub-series of hash words being nonrandomly positioned within each of the M interleaved sub-series of hash words;
   selection means for successively applying each of said M interleaved sub-series to a database in which for a plurality of multi-media signals, a sub-sampled sequence of hash words has been stored; and
   computer means for identifying the unknown signal as the multi-media signal based on whether a difference between at least a part of the stored sub-sampled sequence of hash words and at least one of the M applied interleaved sub-series of hash words is less than a specific threshold value.

5. A method of identifying an unknown audio-visual media signal, the method comprising:
   receiving, from a remote station, a series of hash words generated by dividing at least a part of the unknown audio-visual media signal into a series of frames, and extracting, for each frame, a hash word based on a perceptually essential property of the signal within said frame;
   dividing said series of hash words into M interleaved sub-series of hash words, each hash word of each of the M interleaved sub-series of hash words being extracted from a different frame of the series of frames, each frame of the series of frames overlapping in time with an adjacent frame of the series of frames, from which an adjacent hash word of the M interleaved sub-series of hash words is extracted, and each hash word of each of the M interleaved sub-series of hash words being nonrandomly positioned within each of the M interleaved sub-series of hash words;
   successively applying each of said M interleaved sub-series to a database in which, for a plurality of multi-media signals, a sub-sampled sequence of hash words has been stored; and
   identifying the unknown signal as the multi-media signal based on whether a difference between at least a part of the stored sub-sampled sequence of hash words and at least one of the M applied interleaved sub-series of hash words is less than a specific threshold value.

6. A method as claimed in claim 5, wherein each frame of said series of frames are overlapping in time with an adjacent frame.

7. A system to store fingerprints identifying audio-visual media signals (K(t)) in a database, the arrangement comprising:

a framing circuit to divide said audio-visual media signals into a sequence of overlapping frames;

sub-sampler to sub-sample said sequence of frames by a factor M to obtain a sub-sampled sequence of frames, each frame overlapping in time with an adjacent frame of the sub-sampled sequence of frames, and the factor M being a positive integer;

a hash extracting circuit to extract for each frame of said sub-sampled sequence of frames, a hash word (H(n)) derived from a perceptually essential property of the signal within said frame, to obtain a respective sub-sampled sequence of hash words, each hash word of the sub-sampled sequence of hash words being nonrandomly positioned within the sub-sampled sequence of hash words; and a database for storing said sub-sampled sequence of hash words as a fingerprint in said database, the fingerprint being a digital summary of the audio visual media signal.

8. A system to identify an unknown audio-visual media signal, the arrangement comprising:

a framing circuit to divide at least a part of the unknown audio-visual media signal (U(t)) into a series of frames;

a hash extracting circuit, to extract for each frame, a hash word derived from a perceptually essential property of the signal within said frame, to obtain a respective series of hash words;

an interleaving circuit to divide said series of hash words into M interleaved sub-series of hash words, each hash word of each of the M interleaved sub-series of hash words being extracted from a different frame of the series of frames, each frame of the series of frames overlapping in time with an adjacent frame of the series of frames, from which an adjacent hash word of the M interleaved sub-series of hash words is extracted, and each hash word of each of the M interleaved sub-series of hash words being nonrandomly positioned within each of the M interleaved sub-series of hash words;

a selection circuit to successively apply each of said M interleaved sub-series to a database in which for a plurality of multi-media signals, a sub-sampled sequence of hash words has been stored; and a computer to identify the unknown signal as the multimedia signal based on whether a difference between at least a part of the stored sub-sampled sequence of hash words and at least one of the M applied interleaved sub-series of hash words is less than a specific threshold value.

* * * * *